United States Patent
Rheaume

(10) Patent No.: US 11,566,460 B2
(45) Date of Patent: Jan. 31, 2023

(54) HINGE ASSEMBLY

(71) Applicant: MHI RJ Aviation ULC, Vancouver (CA)

(72) Inventor: Michel Rheaume, St-Hippolyte (CA)

(73) Assignee: MHI RJ Aviation ULC, Vancouver (CA)

( * ) Notice: Subject to any disclaimer, the term of this patent is extended or adjusted under 35 U.S.C. 154(b) by 384 days.

(21) Appl. No.: 16/471,122

(22) PCT Filed: Dec. 13, 2017

(86) PCT No.: PCT/IB2017/057912
§ 371 (c)(1),
(2) Date: Jun. 19, 2019

(87) PCT Pub. No.: WO2018/116084
PCT Pub. Date: Jun. 28, 2018

(65) Prior Publication Data
US 2020/0040633 A1 Feb. 6, 2020

Related U.S. Application Data

(60) Provisional application No. 62/436,556, filed on Dec. 20, 2016.

(51) Int. Cl.
*E05D 15/46* (2006.01)
*B64D 11/00* (2006.01)

(52) U.S. Cl.
CPC .......... *E05D 15/463* (2013.01); *B64D 11/003* (2013.01); *Y10T 16/551* (2015.01)

(58) Field of Classification Search
CPC ..... E05D 15/401; E05D 15/463; E05D 13/10; B64D 11/003; E05F 3/20; E05F 3/224;
(Continued)

(56) References Cited

U.S. PATENT DOCUMENTS 4,138,988 A 2/1979 Hurley
4,383,347 A * 5/1983 La Conte .............. E05F 1/1292
16/370
(Continued)

FOREIGN PATENT DOCUMENTS

CN 105813940 A 7/2016
WO 2007048914 A1 5/2007
(Continued)

OTHER PUBLICATIONS

PCT international Search Report and Written Opinion dated Mar. 6, 2018 re: International Application No. PCT/IB2017/057912.
(Continued)

*Primary Examiner* — William L Miller
(74) *Attorney, Agent, or Firm* — Osha Bergman Watanabe & Burton LLP

(57) ABSTRACT

A hinge assembly for receiving a door, for example for an aircraft storage bin, and including a wall having opposed inner and outer surfaces, an edge of the wall including two spaced apart wall panels extending from a respective one of the inner and outer surfaces and defining part of a perimeter of an opening closable by the door; a pivot located between the wall panels, the pivot defining a pivot axis intersecting the wall panels; and a hinge arm having a portion received between the wall panels and engaged to the pivot, the hinge arm extending away from the wall panels and configured for attachment to the door, the hinge arm pivotable about the pivot axis to be movable between open and closed positions of the door, the hinge arm movable between the open and closed position within a plane extending between the opposed inner and outer surfaces.

18 Claims, 7 Drawing Sheets

(58) Field of Classification Search
CPC .................. E05F 1/1292; E05F 1/1091; E05Y
2900/502; E05Y 2900/538; E05Y
2201/264; Y10T 16/52; Y10T 16/2771;
Y10T 16/304; Y10T 16/53885; Y10T
16/551; Y10T 16/552; Y10T 16/61
USPC ............... 16/221, 54, 50, 82, 306, 374, 378;
244/118.5, 118.1
See application file for complete search history.

(56) References Cited

U.S. PATENT DOCUMENTS

| | | | | |
|---|---|---|---|---|
| 4,383,392 | A * | 5/1983 | La Conte | B64D 11/003 49/248 |
| 5,409,308 | A * | 4/1995 | Reuter | E05D 15/40 312/328 |
| 5,567,028 | A * | 10/1996 | Lutovsky | B64D 11/003 312/246 |
| 6,045,204 | A * | 4/2000 | Frazier | B64D 11/003 16/370 |
| 6,398,163 | B1 * | 6/2002 | Welch | B64D 11/003 244/118.1 |
| 9,327,834 | B2 * | 5/2016 | Paulino | B64D 11/003 |
| 9,878,791 | B2 * | 1/2018 | Kammerer | B64D 11/003 |
| 10,106,258 | B2 * | 10/2018 | Kammerer | B64D 11/003 |
| 10,315,768 | B2 * | 6/2019 | Schorkhuber | B64D 11/003 |
| 10,364,032 | B2 * | 7/2019 | Kammerer | B64D 11/00 |
| 10,760,315 | B2 * | 9/2020 | Chadwell | B64D 11/003 |
| 2003/0080247 | A1 * | 5/2003 | Frazier | B64D 11/003 244/118.1 |
| 2003/0116988 | A1 | 6/2003 | Stelandre et al. | |
| 2005/0040287 | A1 | 2/2005 | Stephan et al. | |
| 2005/0264144 | A1 * | 12/2005 | Verbeek | E05F 1/1091 312/323 |
| 2014/0197721 | A1 * | 7/2014 | Savian | B64D 11/003 312/248 |
| 2014/0246968 | A1 * | 9/2014 | Geng | B64D 11/003 312/319.2 |
| 2014/0283336 | A1 * | 9/2014 | Cloud | B64D 11/003 16/72 |
| 2015/0307192 | A1 * | 10/2015 | Savian | B64D 11/003 244/118.5 |
| 2016/0083090 | A1 * | 3/2016 | Savian | B64D 11/0015 244/118.5 |
| 2016/0114889 | A1 * | 4/2016 | Kearsey | A47B 46/005 312/246 |
| 2017/0066533 | A1 * | 3/2017 | Long | B64D 11/003 |
| 2017/0137130 | A1 * | 5/2017 | Kammerer | B64D 11/003 |
| 2017/0283058 | A1 * | 10/2017 | Papke | B64D 11/003 |
| 2018/0050801 | A1 * | 2/2018 | Savian | B64D 11/003 |
| 2018/0209197 | A1 * | 7/2018 | Williams | E05F 1/1058 |
| 2018/0319501 | A1 * | 11/2018 | Schörkhuber | E05F 3/22 |
| 2019/0017308 | A1 * | 1/2019 | Chadwell | E05F 1/1292 |
| 2021/0040786 | A1 * | 2/2021 | Heimbach | B60R 7/04 |

FOREIGN PATENT DOCUMENTS

| | | |
|---|---|---|
| WO | 2008012427 A1 | 1/2008 |
| WO | 2016007915 A1 | 1/2016 |

OTHER PUBLICATIONS

The First Office Action issued in corresponding Chinese Patent Application No. 201780078691.9, dated May 7, 2022 (17 pages).

* cited by examiner

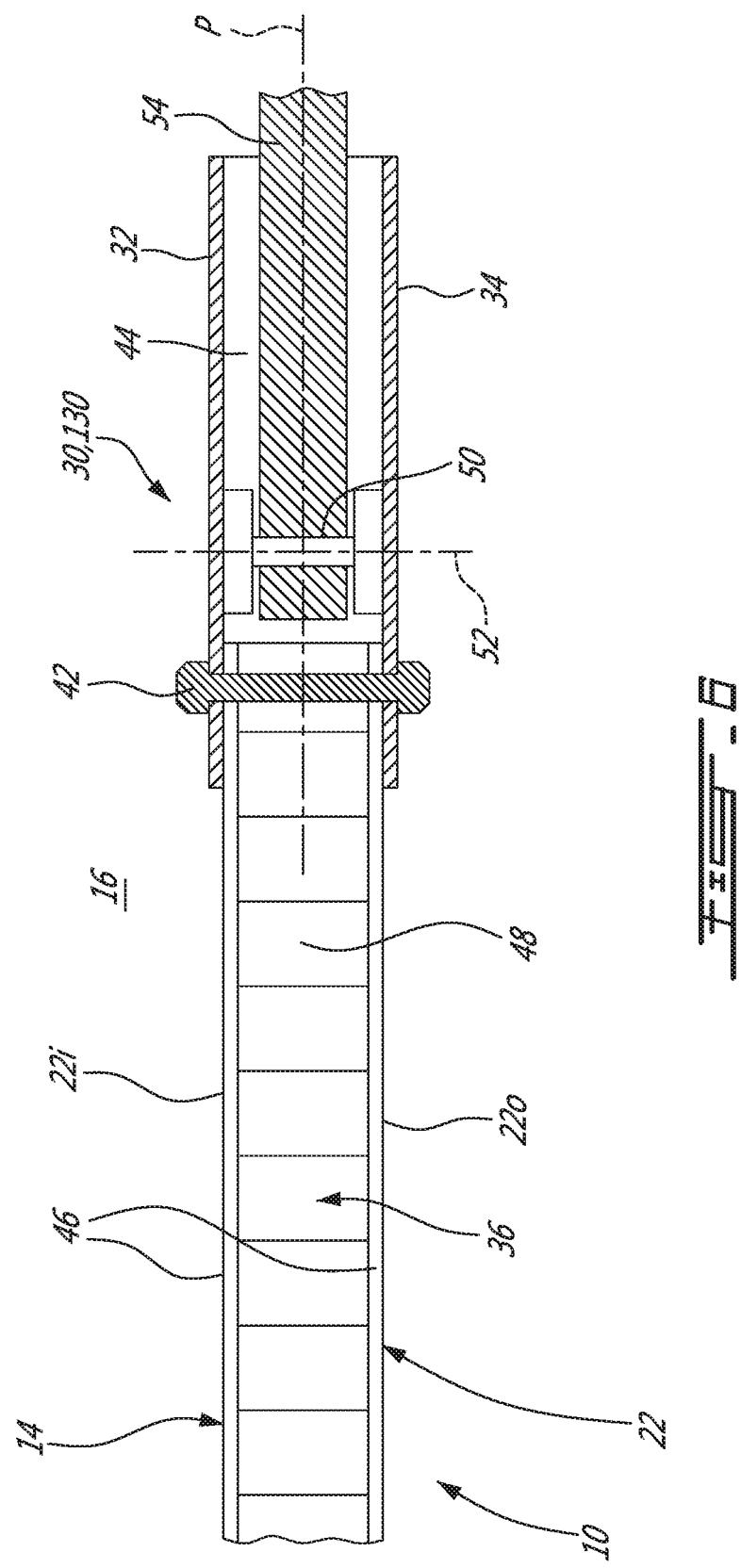

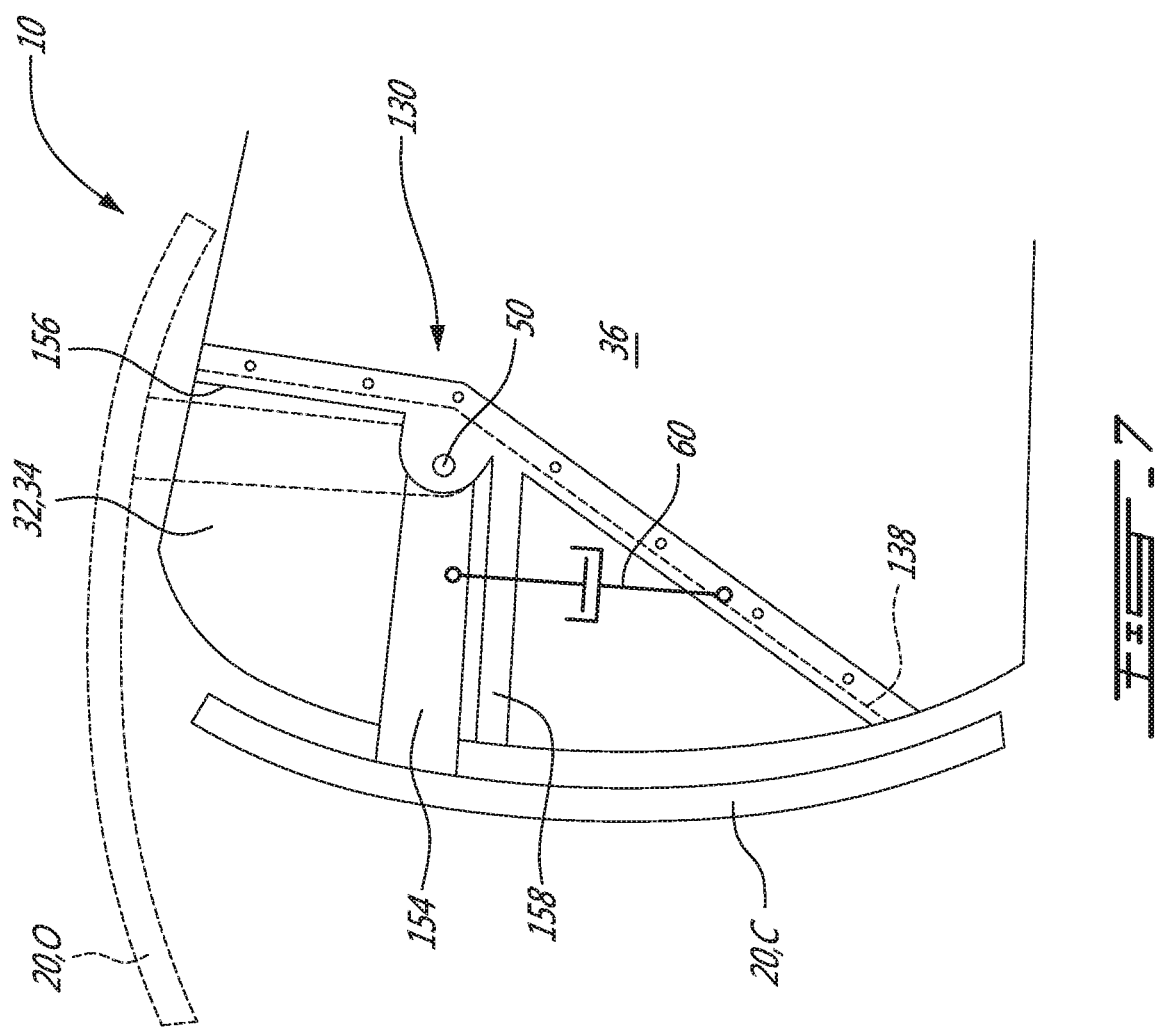

HINGE ASSEMBLY

CROSS-REFERENCE TO RELATED APPLICATIONS

This application is a national phase application under 35 U.S.C. 371 of International Patent Application No. PCT/IB2017/057912 filed on Dec. 13, 2017, which claims priority from U.S. provisional application No. 62/436,556 filed Dec. 20, 2016, the entire contents of which are incorporated by reference herein.

TECHNICAL FIELD

The application relates generally to a hinge assembly and, more particularly, to a hinge assembly for retaining a door of a storage bin.

BACKGROUND OF THE ART

Overhead bins in aircraft cabins typically have door hinges which are received within the storage space of the bins, for example attached to an inner surface of the bin walls. The hinges accordingly reduce the available storage space within the bin, and accordingly the amount of luggage which can be stored within the bin.

SUMMARY

In one aspect, there is provided a hinge assembly for receiving a door, the hinge assembly comprising: a wall having opposed inner and outer surfaces, an edge of the wall including two spaced apart wall panels extending from a respective one of the inner and outer surfaces, the wall panels defining part of a perimeter of an opening closable by the door; a pivot located between the wall panels, the pivot defining a pivot axis intersecting the wall panels; and a hinge arm having a portion received between the wall panels and engaged to the pivot, the hinge arm extending away from the wall panels and configured for attachment to the door, the hinge arm pivotable about the pivot axis to be movable between open and closed positions of the door, the hinge arm movable between the open and closed position within a plane extending between the opposed inner and outer surfaces.

In particular embodiments, the hinge assembly can include any one or any combination of the following:
the wall includes a wall body defining the inner and outer surfaces, and the wall panels are detachably connected to the wall body on a respective one of the inner and outer surfaces;
the wall body includes honeycomb material;
the wall body and wall panels include different materials
the wall panels are interconnected in a monolithic manner, or the wall panels are detachably interconnected;
a first stop abutting the hinge arm in the closed position and a second stop abutting the hinge arm in the open position;
a damper pivotally connected to the hinge arm and to at least one of the wall panels.

In another aspect, there is provided a storage bin comprising: a bin body defining a storage space and an opening for accessing the storage space, the bin body including a wall having an inner surface within the storage space and an opposed outer surface outside of the storage space, an edge of the wall including two spaced apart wall panels extending from a respective one of the inner and outer surfaces and defining part of a perimeter of the opening; a pivot located between the wall panels, the pivot defining a pivot axis intersecting the wall panels; a hinge arm having a portion located between the wall panels and engaged to the pivot, the hinge arm extending away from the wall panels, the hinge arm pivotable about the pivot axis to be movable within a plane aligned with the wall; and a door engaged to the hinge arm, wherein pivoting of the hinge arm moves the door between a closed position where the door closes the opening and an open position where the door is away from the opening and the opening is accessible.

In particular embodiments, the storage bin can include any one or any combination of the following:
the wall includes a wall body defining the inner and outer surfaces, and the wall panels are detachably connected to the wall body on a respective one of the inner and outer surfaces;
the wall body includes honeycomb material;
the wall body and wall panels include different materials;
the plane of the hinge arm is vertical and the door moves upwardly from the closed position to the open position;
the wall panels are interconnected in a monolithic manner, or the wall panels are detachably interconnected;
a first stop abutting the hinge arm in the closed position and a second stop abutting the hinge arm in the open position;
a damper pivotally connected to the hinge arm and to at least one of the wall panels.

In a particular embodiment, the wall is a first wall, the bin body including a second wall opposite the first wall, the second wall having an inner surface within the storage space and an opposed outer surface outside of the storage space, an edge of the second wall including two additional spaced apart wall panels, the bin further comprising an additional pivot located between the additional wall panels, and an additional hinge arm having a portion located between the additional wall panels and engaged to the additional pivot, the additional hinge arm extending away from the additional wall panels and engaged to the door, the additional hinge arm pivotable about the pivot to be movable within an additional plane aligned with the additional wall.

In a further aspect, there is provided a method of connecting a door to a wall, the method comprising: defining a receiving space along an edge of a wall defining part of a perimeter of an opening to be closed by the door; pivotally connecting a hinge arm to a pivot extending within the receiving space so that the hinge arm is pivotable within a plane aligned with the wall; and connecting the door to the hinge arm.

In a particular embodiment, the wall is a first wall, and the method further comprises: defining an additional receiving space along an edge of a second wall opposite the first wall; pivotally connecting an additional hinge arm to an additional pivot extending within the additional receiving space so that the additional hinge arm is pivotable within an additional plane aligned with the second wall; and connecting the door to the additional hinge arm.

DESCRIPTION OF THE DRAWINGS

For a better understanding of the present invention, as well as other aspects and further features thereof, reference is made to the following description which is to be used in conjunction with the accompanying drawings, where.

FIG. 6 is a cross-sectional view of part of the hinge assembly of FIG. 3, in accordance with a particular embodiment; and FIG. 7 is a cross-sectional view of a hinge assembly in accordance with another particular embodiment which may be used with the overhead bins of FIG. 2.

Figure 1:
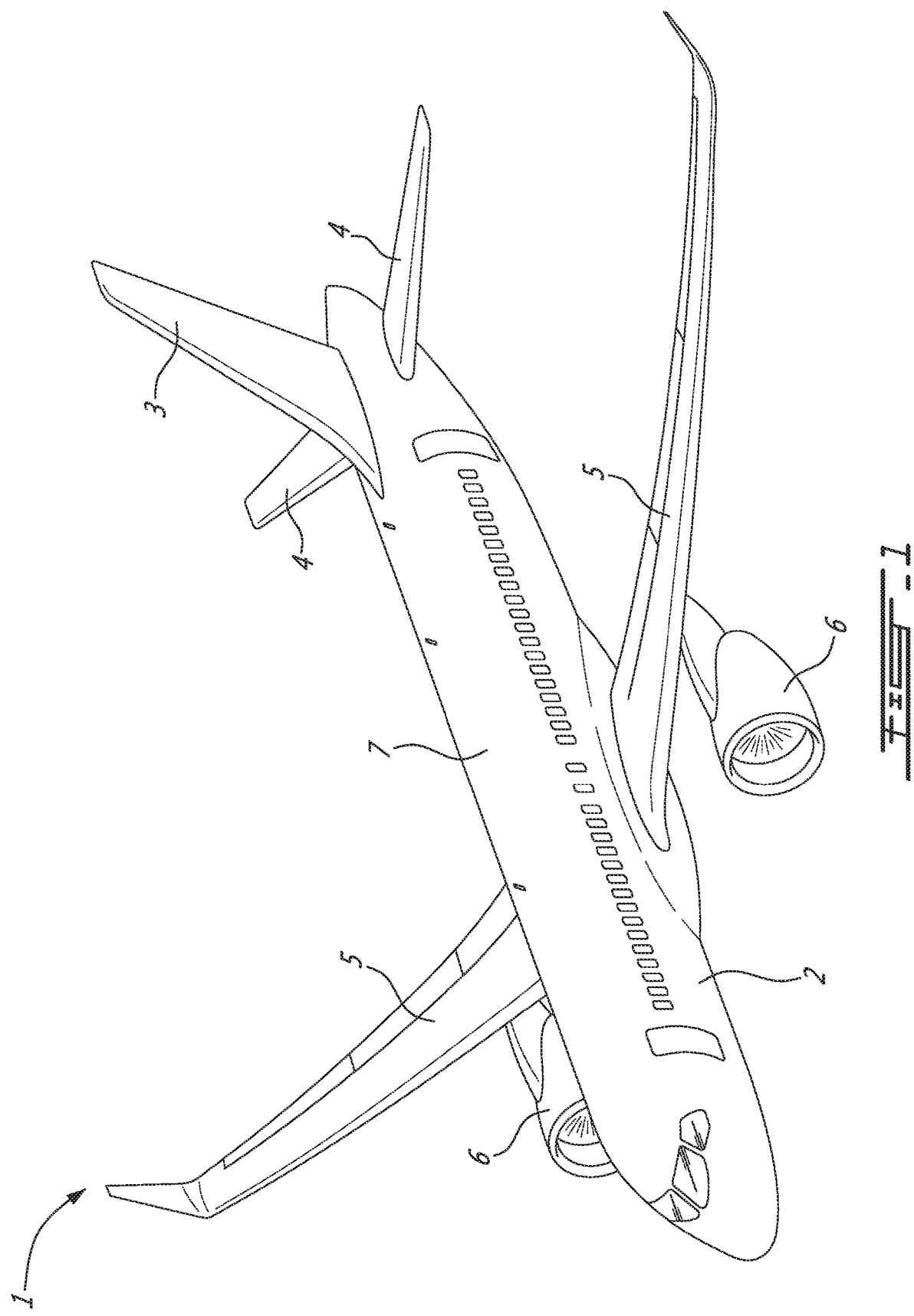
FIG. 1 is a schematic tridimensional view of an aircraft in accordance with a particular embodiment.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin 7 generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Figure 2:
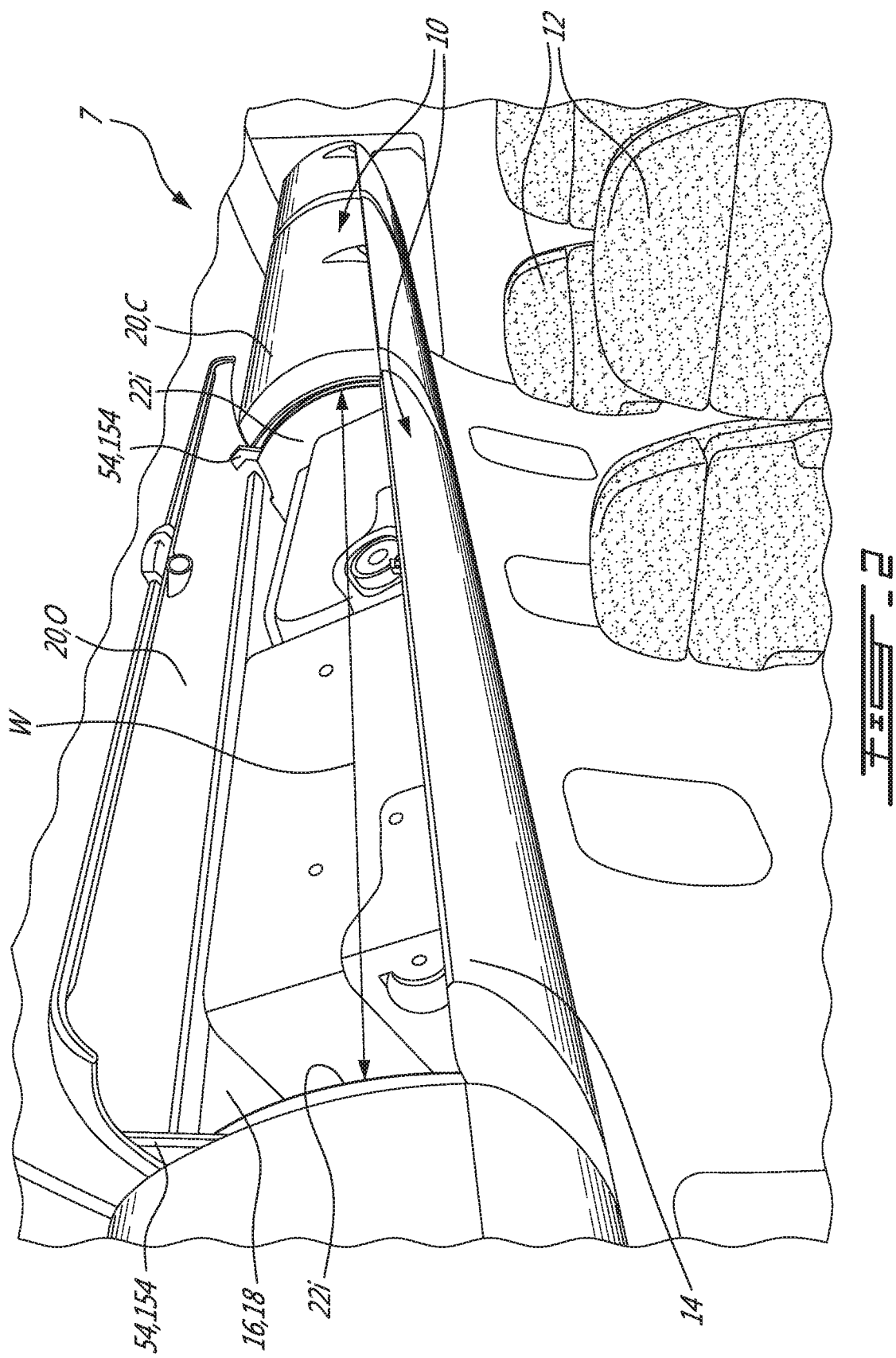
FIG. 2 is a tridimensional view of part of a cabin of an aircraft such as shown in FIG. 1, showing overhead bins with doors in open and closed positions.

Referring to FIG. 2, the aircraft cabin 7 includes storage bins 10, which are configured as overhead storage bins located over passenger seats 12 in the example shown. Each storage bin 10 includes a bin body 14 defining a storage space 16 (for e.g. luggage) and an opening 18 for accessing the storage space 16. The storage bin 10 includes a door 20 pivotable between a closed position C where the door 20 closes the opening 18 and an open position O where the door 20 is away from the opening 18 and the opening 18 is accessible. It is understood that the particular configuration shown for the bin 10 is exemplary only and that any other suitable configuration may alternately be used.

Referring to FIGS. 3-6, the storage bin 10 includes a plurality of walls 22 which have an inner surface 22$i$ (FIGS. 5-6) located within the storage space 16 and an opposed outer surface (FIGS. 3-4 and 6) located outside of the storage space 16. The dimensions of the storage space 16 are thus defined between the inner surface 22$i$ of the walls 22. For example, a width W (FIG. 2) of the storage space 16 is defined between the inner surfaces 22$i$ of the opposed side walls 22.

Still referring to FIGS. 3-6, a hinge assembly 30 in accordance with a particular embodiment is shown. The hinge assembly 30 is configured for receiving the door 20 to allow movement of the door 20 between the open and closed positions.

One wall 22 of the bin body 14, which in the embodiment shown is a side wall, has an edge including two spaced apart wall panels: an inner wall panel 32 (omitted from FIG. 5) extending from the inner surface 22$i$ of the wall 22, and an outer panel 34 (omitted from FIG. 4) extending from the outer surface 22$o$ of the wall 22. The wall panels 32, 34 define part of the perimeter of the opening 18 of the storage bin 10.

Figure 4:
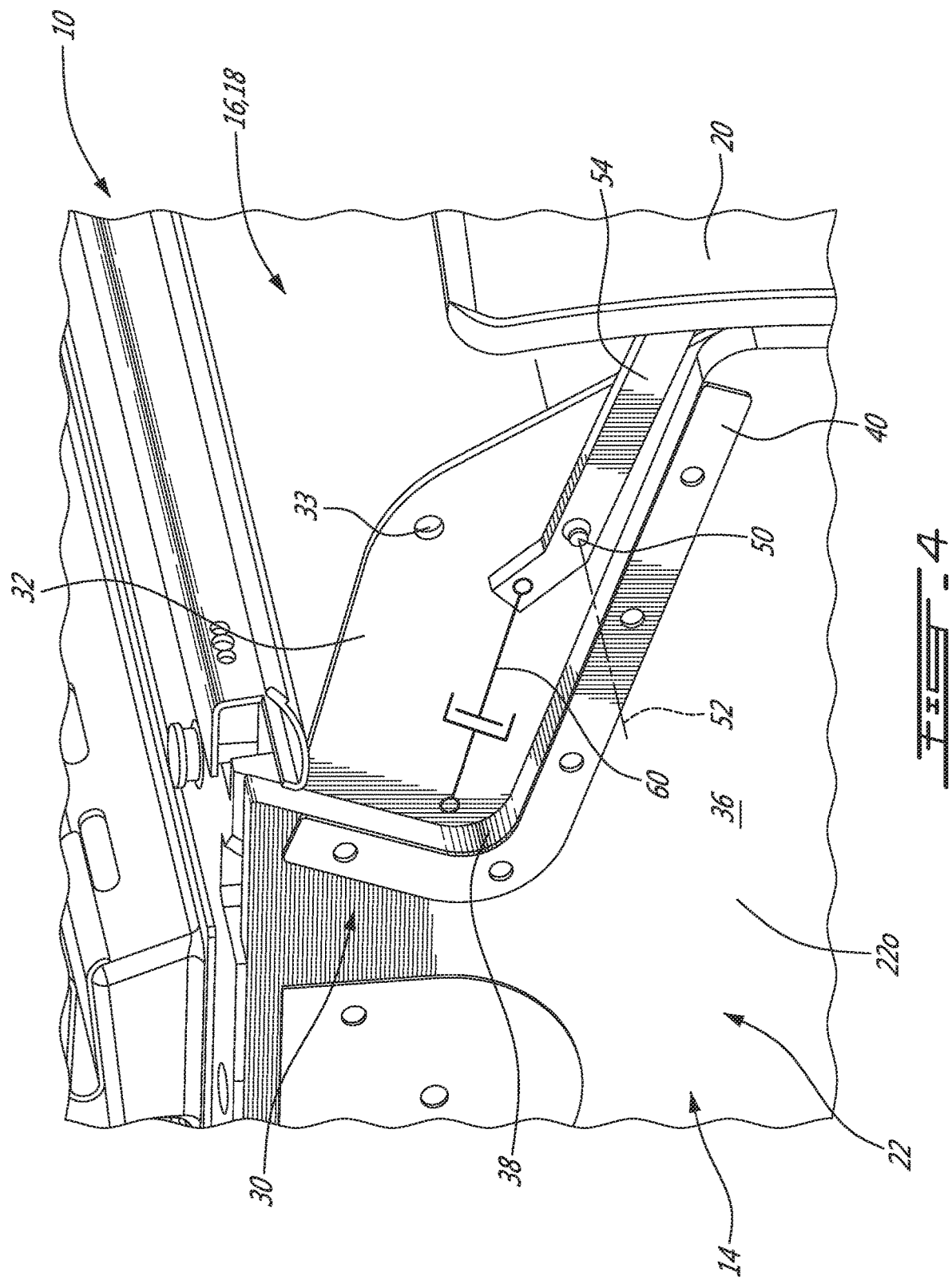
FIG. 4 is a tridimensional view of part of the hinge assembly of FIG. 3, with an outer wall panel thereof removed.
Figure 5:
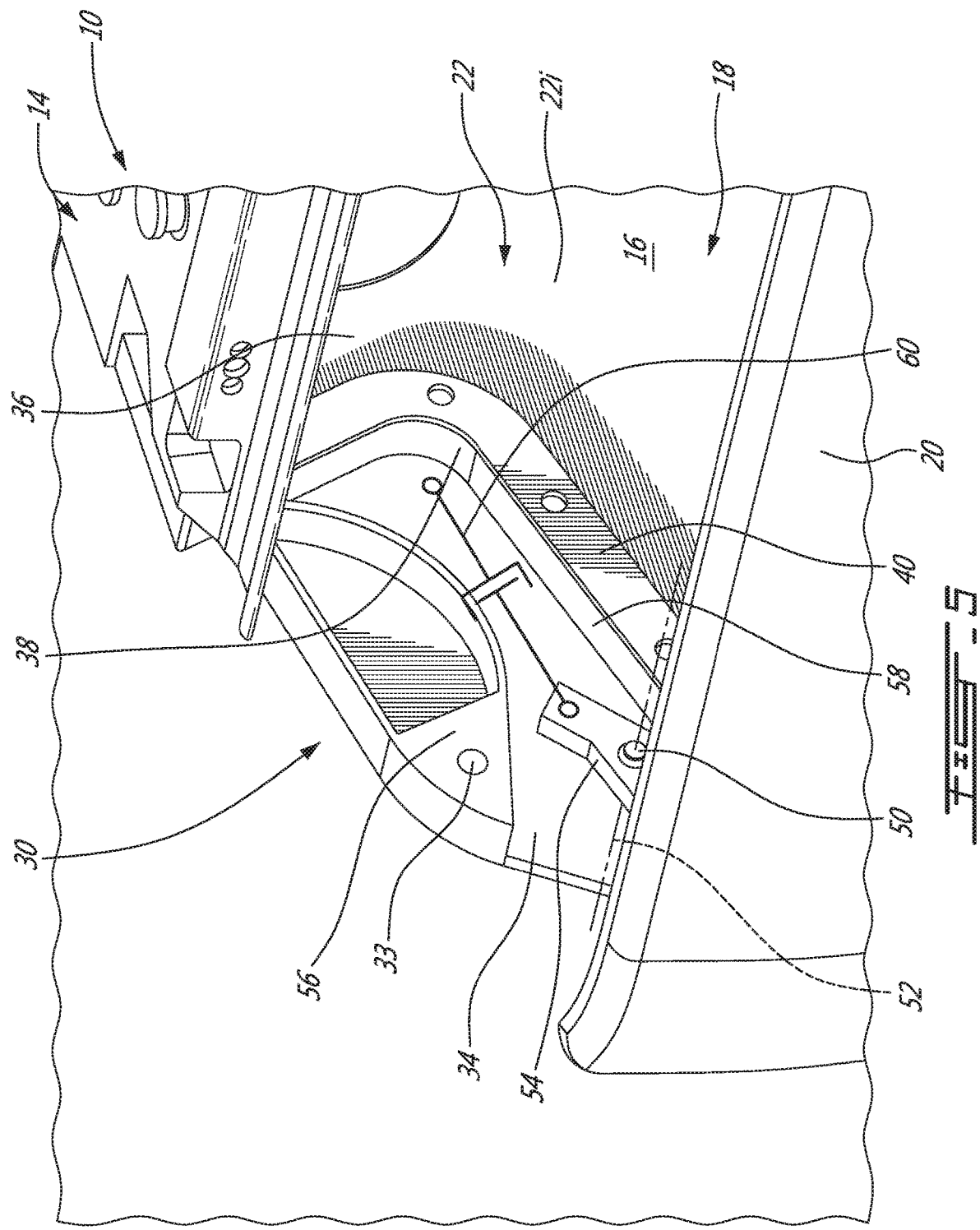
FIG. 5 is a tridimensional view of part of the hinge assembly of FIG. 3, with an inner wall panel thereof removed.

In the embodiment shown, the wall 22 includes a wall body 36 defining the inner and outer surfaces 22$i$, 22$o$. A cut-out 38 (FIGS. 4-5) is defined along the edge of the wall body 36. The inner wall panel 32 is detachably connected to the inner surface 22$i$ of the wall body 36 along the edge of the cut-out 38, and the outer wall panel 34 is detachably connected to the outer surface 22$o$ of the wall body 36 along the edge of the cut-out 38. Seals 40 may optionally be provided between the wall panels 32, 34 and the respective surface 22$i$, 22$o$ of the wall body 36 along their connection. As can be best seen in FIG. 6, the wall panels 32, 34 are connected to the wall body 36 by a plurality of fasteners 42 extending through the wall body 36 and the wall panels 32, 34. Other suitable types of connections may alternately be used, including detachable connections (i.e. connections which are detachable without causing damage to the wall body 36 and the wall panels 32, 34), and permanent connections (i.e. connections which are not detachable without causing damage to one or both of the wall body 36 and the wall panels 32, 34). In the embodiment shown, the two wall panels 32, 34 are also detachably connected to each other, for example through complementary clips or suitable fasteners 33 (FIGS. 4-5).

Figure 3:
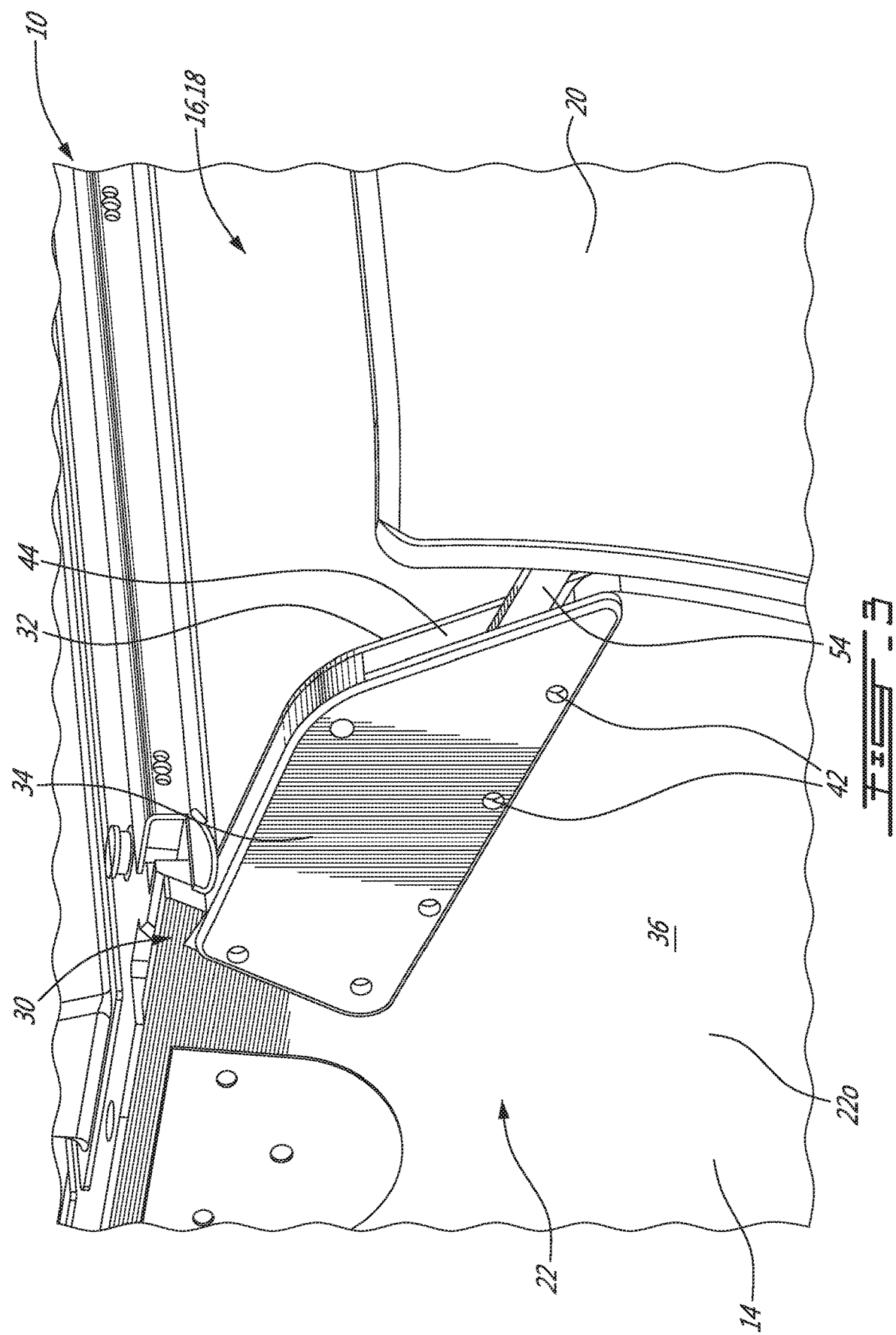
FIG. 3 is a tridimensional view of a hinge assembly in accordance with a particular embodiment which may be used with the overhead bins of FIG. 2.

The wall panels 32, 34 thus extend from the edge of the cut-out 38 to complete the perimeter of the opening 18 of the storage bin 10. Referring to FIGS. 3 and 6, a receiving space 44 is accordingly defined between the wall panels 32, 34, bordered by the cut-out edge of the wall body 36.

In a particular embodiment, the wall body 36 and wall panels 32, 34 include different materials. Referring back to FIG. 6, in a particular embodiment, the wall body 36 includes inner and outer panels 46, made for example of fiberglass composite material, interconnected by a honeycomb core 48, and the wall panels 32, 34 include a plastic material suitable for injection molding. Other configurations and materials are of course possible.

Alternately, the wall panels 32, 34 may be defined by an integral part of the wall body 36, for example by a portion of the inner and outer panels 46 extending beyond the core 48.

As can be seen in FIGS. 4-6, the assembly 30 includes a pivot 50 located in the receiving space 44 defined between the wall panels 32, 34. The pivot 50 defines a pivot axis 52 intersecting the wall panels 32, 34; in the embodiment shown, the pivot axis 52 extends perpendicularly to the inner and outer wall surfaces 22$i$, 22$o$. In the embodiment shown, the pivot 50 is connected to both wall panels 32, 34.

The hinge assembly 30 further includes a hinge arm 54 having a portion located in the receiving space 44 between the wall panels 32, 34 and engaged to the pivot 50. The hinge arm 54 has a rigid structure, and is pivotable about the pivot axis 52 to move between the open and closed positions of the door 20. The hinge arm 54 extends away from the wall panels 32, 34 for connection to the door 20. Throughout its pivoting motion, the hinge arm 54 remains within a space defined between a plane of the inner surface 22$i$ of the wall 22 and a plane of the outer surface 22$o$ of the wall 22. In other words, the hinge arm 54 pivots in plane P (FIG. 6) which is aligned with the wall 22, i.e. a plane P extending between the inner and outer surfaces 22i, 22o of the wall 22 at least in proximity of the opening 18, and in a particular embodiment for the entirety of the wall 22.

In the embodiment shown, the plane P of movement of the hinge arm 54 is vertical, and the door 20 moves upwardly from the closed position to the open position. Other configurations are also possible.

The hinge arm 54 is connected to the door 20 using any suitable type of connection. For example, in a particular embodiment the hinge arm 54 includes a connection portion extending parallel to the door 20, having a U-shaped cross-section which defines a recess sized to receive an edge of the door 20, and the edge of the door 20 is slidingly engaged in this complementary recess (not shown). Other configurations are also possible.

In the embodiment shown and referring to FIG. 5, the outer wall panel 34 defines a stop 56 for abutting the hinge arm 54 when the door 20 is in the open position. The cut-out edge of the wall body 36 defines another stop 58 for abutting the hinge arm 54 when the door 20 is in the closed position. Alternately, one or both of the stops 56, 58 may be defined by the inner wall panel 32, or both stops 56, 58 may be defined by the outer wall panel 34.

As can be seen in FIG. 4-5, a damper 60 is pivotally connected to the hinge arm 54 and to one or both of the wall panels 32, 34, and is located in the receiving space 44 between the wall panels 32, 34. The hinge arm 54 is configured so that its connection with the damper 60 and its connection with the pivot 50 are appropriately spaced apart to allow the damper 60 to act on the motion of the hinge arm 54 about the pivot 50. In the embodiment shown, the damper 60 biases the door 20 in the open position, i.e. provides sufficient resistance so as to counteract the weight of the door 20 and allow the door 20 to remain in the open position unless a sufficient force toward the closed position is applied to it. The damper 60 may have any suitable configuration, including, but not limited to, any suitable type of rate control damper which can control motion through tension and compression. Suitable rate control dampers may be fully mechanical, gas-charged or hydraulic, among other possibilities.

In a particular embodiment, a similar hinge assembly 30 is provided in the opposite side wall of the bin 10, so that the door 20 is retained by two hinge arms 54, i.e. on hinge arm 54 on each side of the door 20. The additional hinge assembly includes wall panels 32, 34, a pivot 50 and a hinge arm 54 similar to that previously described and shown. The additional hinge assembly may also include a damper 60; alternately, a single damper may be used to retain the door in the open position.

Referring to FIG. 7, a hinge assembly 130 in accordance with another particular embodiment is shown. Elements similar to that of the embodiment of FIGS. 3-6 are identified by a same reference numeral and will not be further described herein.

In this embodiment, the cut-out 138 defined along the edge of the wall body 36 is larger, so that the hinge arm 154 does not come into contact with the wall body 36 at the closed position. One or both of the wall panels 32, 34 (only one being visible in FIG. 7) accordingly define the stop 158 abutting the hinge arm 154 at the closed position. The stop 156 abutting the hinge arm 154 at the open position is defined by one or both of the wall panels 32, 34, in proximity of the edge of the c out 138 in the wall body 36.

In this embodiment, the wall panels 32, 34 are integrally connected to each other, forming part of a monolithic structure. The edge of the wall body 36 is accordingly inserted between the two wall panels 32, 34 before connecting the wall panels 32, 34 to the wall body 36, for example using 42 fasteners as shown in FIG. 6.

A similar hinge assembly 130 may also be provided in the opposite side wall of the bin 10, as described above.

In a particular embodiment and in use, the door 20 is accordingly connected to the wall 22 in accordance with the following. The receiving space 44 is defined along the edge of the wall forming part of the perimeter of the opening 18 to be closed by the door 20. The hinge arm 54, 154 is pivotally connected to the pivot 50 extending within the receiving space 44 so that the hinge arm 54, 154 is pivotable within a plane aligned with the wall 22. The door 20 is connected to the hinge arm 54, 154.

In a particular embodiment, the receiving space 44 is defined by attaching the wall panels 32, 34 to the wall body 36. In an alternate embodiment, the wall panels 32, 34 may be an integral part of the wall body 36, and the receiving space 44 may be defined for example by removing part of a core extending between the wall panels 32, 34.

In a particular embodiment, an additional receiving space 44 is defined along the edge of an opposite wall 22, and another hinge arm 54, 154 is pivotally connected to a pivot 50 extending within the additional receiving space 44 so that the other hinge arm 54, 154 is pivotable within a plane aligned with this wall 22. The door 20 is connected to both hinge arms 54, 154.

In a particular embodiment, the hinge assembly 30, 130 advantageously allows for support of the door 20 without causing an obstruction in the storage space 16, since the hinge arm 54, 154 remains outward of the inner wall surface 22i of the corresponding wall 22, and the structure supporting the hinge arm 54, 154 is also provided outward of the inner wall surface 22i. The only protrusion of the hinge assembly 30, 130 within the storage space 16 corresponds to the thickness of the inner wall panel 32 where it is attached to the inner surface 22i of the wall body 36. However, the panel thickness is a negligible dimension when compared to the width W of the storage space 16. Accordingly, substantially the entire width W of the storage space 16 remains available for storage.

Alternately, an indentation may be defined in the wall body 36 at the connection with the inner wall panel 32, so that the inner surface of the inner wall panel 32 is aligned with the inner surface 22i of the wall body 36. In that case, the entire width W of the storage space 16 remains available for storage.

By contrast, prior art hinges connected to the inner surface of the wall and protruding within the storage space can have a width of for example 1 inch, which for an embodiment where hinges are provided on both sides of the door, creates a 2 inch obstruction to the usable width of the storage space 16. The hinge assembly 30, 130 can thus allow for an improved storage capacity for the bin 10.

Although described as used with an aircraft storage bin 10, it is understood that the hinge assembly 30, 130 can be used with other types of storage spaces, including, but not limited to, with a galley door.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A hinge assembly for receiving a door, the hinge assembly comprising:
    a wall having opposed inner and outer surfaces, an edge of the wall including two spaced apart wall panels extending from a respective one of the inner and outer surfaces, the wall panels defining part of a perimeter of an opening closable by the door;
    a pivot located between the wall panels, the pivot defining a pivot axis intersecting the wall panels;
    a hinge arm having a portion received between the wall panels and engaged to the pivot, the hinge arm extending away from the wall panels and configured for attachment to the door, the hinge arm pivotable about the pivot axis to be movable between open and closed positions of the door, the hinge arm movable between the open and closed position within a plane extending between the opposed inner and outer surfaces; and
    a first stop abutting the hinge arm in the closed position and a second stop abutting the hinge arm in the open position.

2. The assembly as defined in claim 1, wherein the wall includes a wall body defining the inner and outer surfaces, and the wall panels are detachably connected to the wall body on a respective one of the inner and outer surfaces.

3. The assembly as defined in claim 2, wherein the wall body includes honeycomb material.

4. The assembly as defined in claim 2, wherein the wall body and wall panels include different materials.

5. The assembly as defined in claim 1, wherein the wall panels are interconnected in a monolithic manner.

6. The assembly as defined in claim 1, wherein the wall panels are detachably interconnected.

7. The assembly as defined in claim 1, further comprising a damper pivotally connected to the hinge arm and to at least one of the wall panels.

8. A storage bin comprising:
    a bin body defining a storage space and an opening for accessing the storage space, the bin body including a wall having an inner surface within the storage space and an opposed outer surface outside of the storage space, an edge of the wall including two spaced apart wall panels extending from a respective one of the inner and outer surfaces and defining part of a perimeter of the opening;
    a pivot located between the wall panels, the pivot defining a pivot axis intersecting the wall panels;
    a hinge arm having a portion located between the wall panels and engaged to the pivot, the hinge arm extending away from the wall panels, the hinge arm pivotable about the pivot axis to be movable within a plane aligned with the wall;
    a door engaged to the hinge arm, wherein pivoting of the hinge arm moves the door between a closed position where the door closes the opening and an open position where the door is away from the opening and the opening is accessible; and
    a first stop abutting the hinge arm in the closed position and a second stop abutting the hinge arm in the open position.

9. The storage bin as defined in claim 8, wherein the wall includes a wall body defining the inner and outer surfaces, and the wall panels are detachably connected to the wall body on a respective one of the inner and outer surfaces.

10. The storage bin as defined in claim 9, wherein the wall body includes honeycomb material.

11. The storage bin as defined in claim 9, wherein the wall body and wall panels include different materials.

12. The storage bin as defined in claim 8, wherein the plane of the hinge arm is vertical and the door moves upwardly from the closed position to the open position.

13. The storage bin as defined in claim 8, wherein the wall panels are interconnected in a monolithic manner.

14. The storage bin as defined in claim 8, wherein the wall panels are detachably interconnected.

15. The storage bin as defined in claim 8, further comprising a damper pivotally connected to the hinge arm and to at least one of the wall panels.

16. The storage bin as defined in claim 8, wherein the wall is a first wall, the bin body including a second wall opposite the first wall, the second wall having an inner surface within the storage space and an opposed outer surface outside of the storage space, an edge of the second wall including two additional spaced apart wall panels, the bin further comprising an additional pivot located between the additional wall panels, and an additional hinge arm having a portion located between the additional wall panels and engaged to the additional pivot, the additional hinge arm extending away from the additional wall panels and engaged to the door, the additional hinge arm pivotable about the pivot to be movable within an additional plane aligned with the additional wall.

17. A method of connecting a door to a wall, the method comprising:
    defining a receiving space along an edge of the wall, the wall including two spaced apart wall panels defining part of a perimeter of an opening to be closed by the door;
    pivotally connecting a hinge arm to a pivot between the wall panels and extending within the receiving space so that the hinge arm is pivotable, between a first stop that abuts the hinge arm when the door is in a closed position and a second stop that abuts the hinge arm when the door is in an open position, within a plane aligned with the wall; and
    connecting the door to the hinge arm.

18. The method as defined in claim 17, wherein the wall is a first wall, the method further comprising:
    defining an additional receiving space along an edge of a second wall opposite the first wall;
    pivotally connecting an additional hinge arm to an additional pivot extending within the additional receiving space so that the additional hinge arm is pivotable within an additional plane aligned with the second wall; and
    connecting the door to the additional hinge arm.

* * * * *